Figure 1:
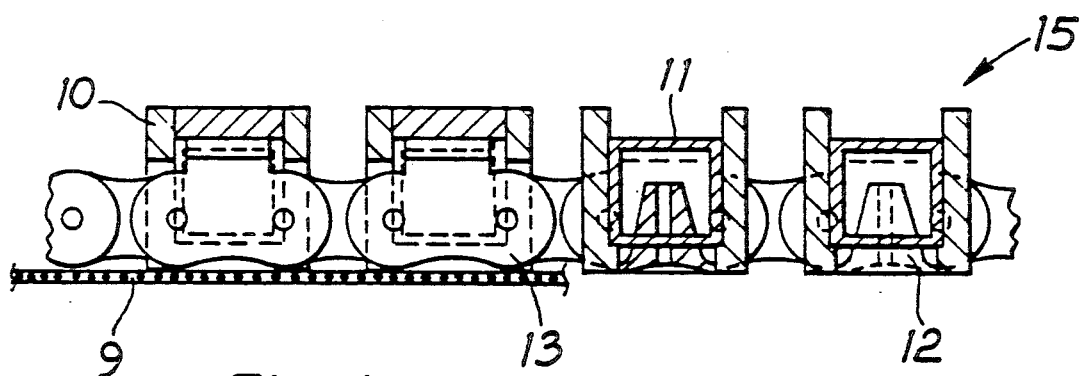

United States Patent [19]
Goodfellow

[11] Patent Number: 5,114,511
[45] Date of Patent: May 19, 1992

[54] MANUFACTURE OF A TUBULAR ARTICLE USING FLEXIBLE CARRIER

[75] Inventor: Anthony G. Goodfellow, Maghull, United Kingdom

[73] Assignee: Bridgestone/Firestone, Inc., Akron, Ohio

[21] Appl. No.: 566,396

[22] PCT Filed: Mar. 13, 1989

[86] PCT No.: PCT/GB89/00259
§ 371 Date: Aug. 22, 1990
§ 102(e) Date: Aug. 22, 1990

[87] PCT Pub. No.: WO89/08545
PCT Pub. Date: Sep. 21, 1989

[30] Foreign Application Priority Data

Mar. 12, 1988 [GB] United Kingdom ............... 8805923

[51] Int. Cl.$^5$ .............................................. B29D 30/30
[52] U.S. Cl. ............................... 156/133; 156/111; 156/123; 156/130; 156/174; 156/218; 156/405.1; 156/406.4
[58] Field of Search ............. 156/174, 111, 123, 130, 156/130.7, 133, 134, 135, 405.1, 406.2, 406.4, 447, 558, 566, 512, 264, 229, 215, 217, 218; 271/184, 185, 225; 198/803.01, 803.2, 465.2

[56] References Cited

U.S. PATENT DOCUMENTS

| 3,057,397 | 10/1962 | Riddle et al. | 156/405.1 |
| 3,236,711 | 2/1966 | Adler | 156/174 |
| 3,674,603 | 7/1972 | Leblond | 156/406.2 |
| 4,398,988 | 8/1983 | Mullender | 156/405.1 |
| 4,783,230 | 11/1988 | Perkins | 156/117 |
| 4,877,468 | 10/1989 | Siegenthaler | 156/111 |

FOREIGN PATENT DOCUMENTS

| 206693 | 12/1986 | European Pat. Off. . | |
| 93345 | 5/1984 | Japan | 156/123 |
| 982033 | 2/1965 | United Kingdom . | |

Primary Examiner—Geoffrey L. Knable
Attorney, Agent, or Firm—Sughrue, Mion, Zinn Macpeak & Seas

[57] ABSTRACT

A method for the manufacture of a tubular article such as a component for deformation into the shape of a pneumatic tire utilizes a flexible carrier (15) for transfer and deformation of sheet material (9) to extend in a tubular form between the carrier and a former (25). The carrier (15) may extend around the former and support the sheet material between the former (25) and carrier (15) particularly if the former is of a type expansible to press the sheet material outward against the carrier. The axial ends (35) of the carrier (15) when in a tubular form around the former may be used axially to space and support a pair of tire beads (36). The sheet material (9) may have an axial length sufficient for it to extend beyond each axial end of the carrier whereby it may be turned radially outward around the respective tire beads.

17 Claims, 8 Drawing Sheets

MANUFACTURE OF A TUBULAR ARTICLE USING FLEXIBLE CARRIER

This invention relates to a method of manufacture of a tubular article and in particular, although not exclusively, to the manufacture of a reinforced and flexible tubular article such as a pneumatic tire, suspension diaphragm or tubular component for such an article. The invention provides also a tubular article such as a pneumatic tire, suspension diaphragm or component for such an article manufactured by the method of the present invention.

A reinforced flexible article such as a pneumatic tire comprises a large number of component parts and the quality of the finished tire is related to the care and accuracy with which these parts are assembled and supported, for example as a tubular part-formed assembly, for subsequent processing such as by deformation, moulding and vulcanisation operations.

The present invention seeks to provide in accordance with one of its aspects an improved method for the manufacture of a tubular article such as a component of or for deformation to form at least a part of a pneumatic tire.

In a method for the manufacture of a tubular article comprising receiving flexible sheet material onto a flexible carrier at a first work station, feeding said sheet material from the first to a second work station whilst said material is supported on and retained by the flexible carrier, and causing said sheet material and flexible carrier to lie at the second work station in a tubular form substantially coaxially relative to a former with the sheet material disposed between the flexible carrier and former, the present invention provides that the flexible carrier is of non-tubular form at said first work station, that the flexible carrier and sheet material supported thereon are caused to adopt a peripherally continuous tubular from at the second work station and that said former and carrier are moved relatively one toward the other whereby said sheet material may be subject to pressure between the former and carrier.

Preferably the former is an expansible former and the flexible carrier is caused to adopt a tubular form in which it extends around the expansible former at the second work station.

The direction relative to the carrier in which the sheet material is received by the carrier at the first work station may be substantially perpendicular to the direction, relative to the carrier, in which sheet material is transferred to the second work station. In that case if the sheet material possesses a substantially tubular form at each work station an elemental strip of the sheet material which lies substantially in the longitudinal direction at the first work station will extend substantially circumferentially at the second work station.

Sheet material when in a substantially tubular form at the first work station preferably is cut or otherwise provided with a pair of transversely, e.g. substantially longitudinally extending, edge regions whereby said material may be unfolded and received by the flexible carrier. The sheet material can be cut or otherwise provided at the first work station with a pair of transverse edges which extend other than in the longitudinal direction between the axial ends of the tubular form. Thus when unfolded onto the carrier the sheet material may be of a parallelogram or other non-rectangular shape. By the method of the invention the sheet material may be transferred from the flexible carrier to the second work station in a direction substantially parallel with the direction of the length of said transverse edges when the sheet material is supported on the carrier.

Preferably use is made of a flexible carrier which is undersized in relation to the width or length of the sheet material to be transported whereby edge regions of the flexible sheet material overhang edge regions of the flexible carrier. It is envisaged that the sheet material will overhang those opposite edges of the carrier which constitute substantially tubular-shaped end regions of the carrier when flexed and disposed to extend substantially coaxially relative to the former at the second work station.

The method is particularly suitable for assembling into a tubular article the carcass reinforcement plies, breaker layer and reinforcing beads of a pneumatic tire. The accurate assembly of at least some of those components at the second work station may be assisted by use of the flexible carrier to position beads and associated bead apex elements and support these beads and apex elements as longitudinal end regions of the sheet material are turned radially outwards around the respective annular reinforcing beads.

In the manufacture of a tubular article comprising two tubular component layers a first component layer may be applied around an expansible type of former and brought into contact with a second component layer supported in tubular form on the flexible carrier when at the second work station by expansion of the former. The first component layer may be applied to the expansible former by means of said flexible carrier. Said expansion of the former may be employed to transfer the first component layer to the second component layer for support thereby.

The method of the present invention may be employed for the manufacture of a tubular article from unreinforced flexible sheet material, reinforced flexible sheet material or a combination of reinforced and unreinforced flexible sheet material. One particularly suitable type of reinforced sheet material is described in the Specification of our co-pending British Patent Application No. 8726626. This Specification describes sheet material having edge regions provided with arrangements of reinforcing cords which may be caused to interlock when the two edge regions are brought together.

Particularly, but not only, in the event that the edge regions of the sheet material may be interlocked at the second work station the flexible carrier initially may cause the sheet material to adopt a generally tubular form around a former and longitudinally extending edge regions of the carrier then may be retracted outwards from the sheet material to allow application of a consolidating roller over the joint region of confronting end portions of the sheet material. When at the second work station longitudinally extending edge regions of the support carrier may be interconnected whereby if the former is of the expansible type the carrier is able to support the sheet material against pressure exerted thereon when the former is expanded.

Figure 2:
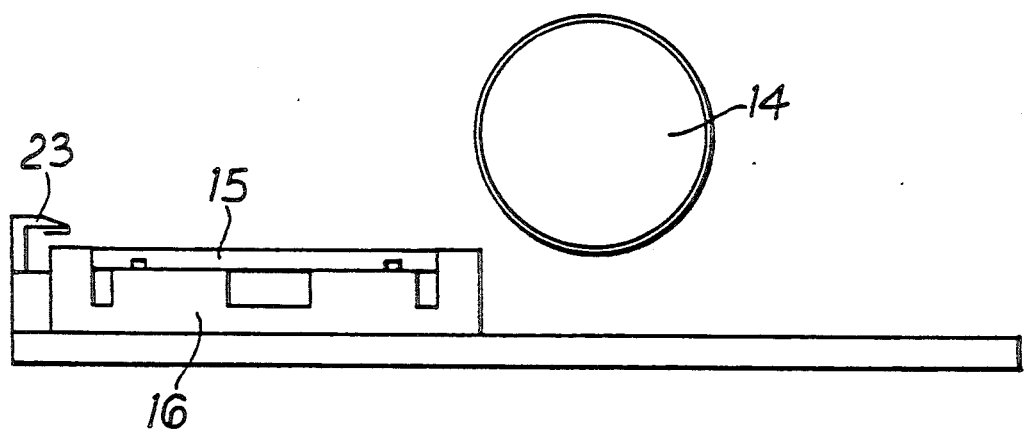
Figure 3:
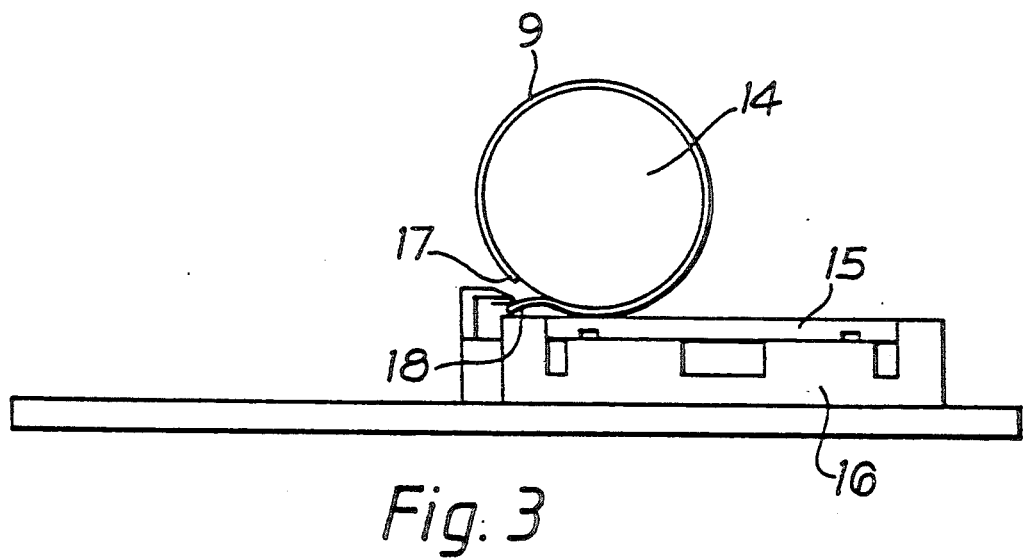
Figure 4:
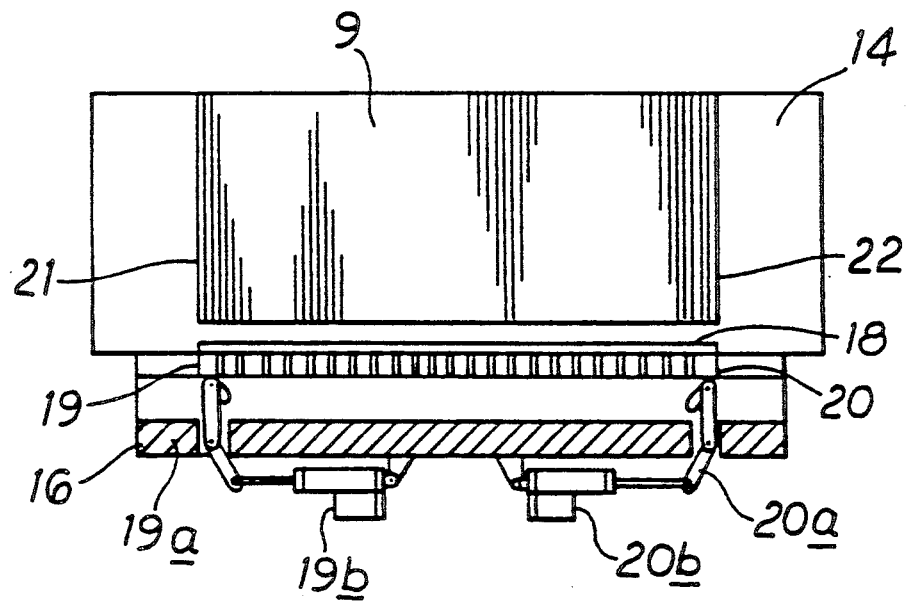
Figure 7:
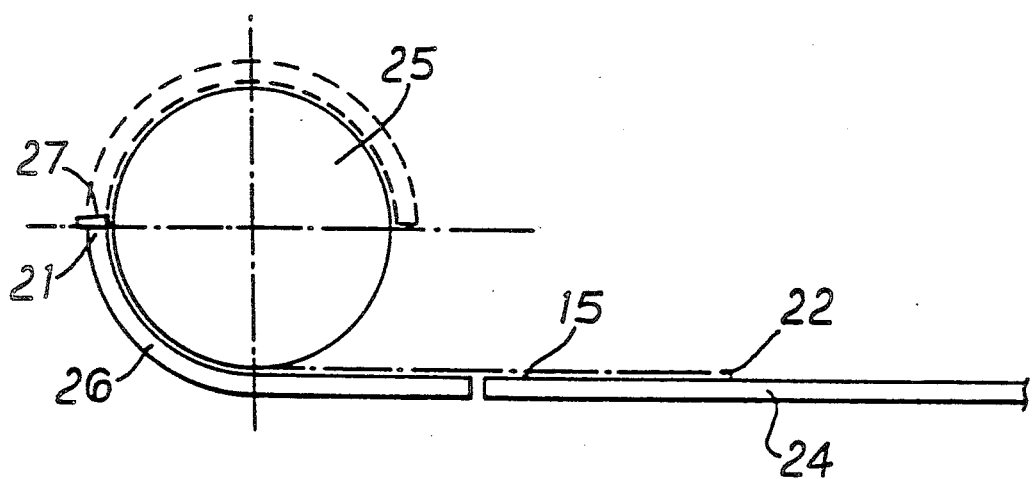
Figure 8:
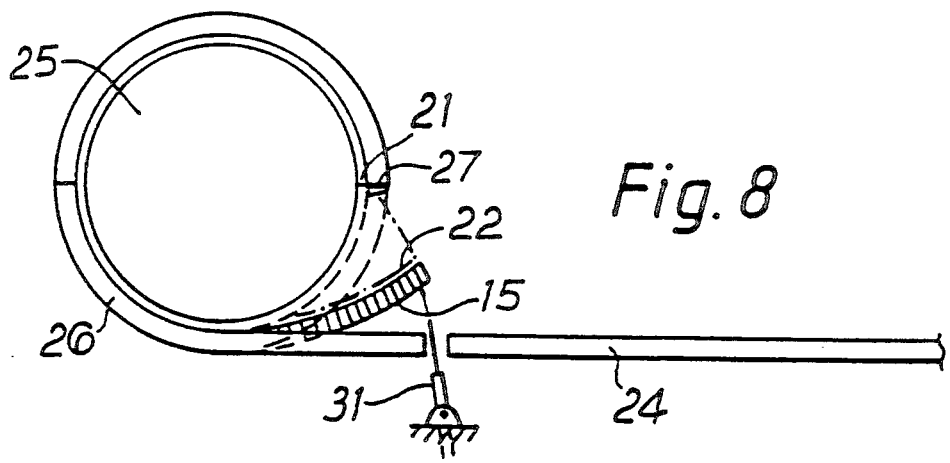
Figure 9:
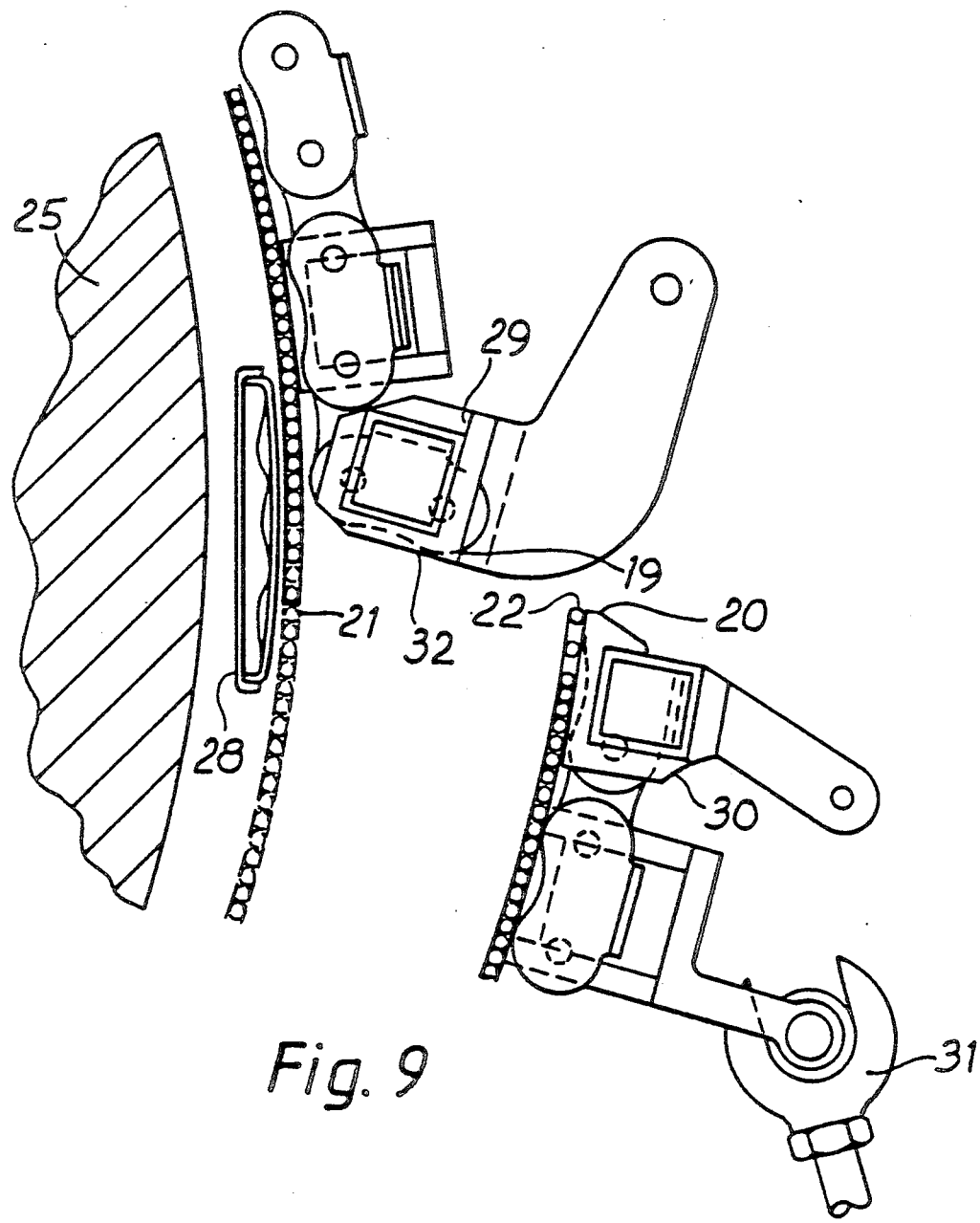
Figure 10:
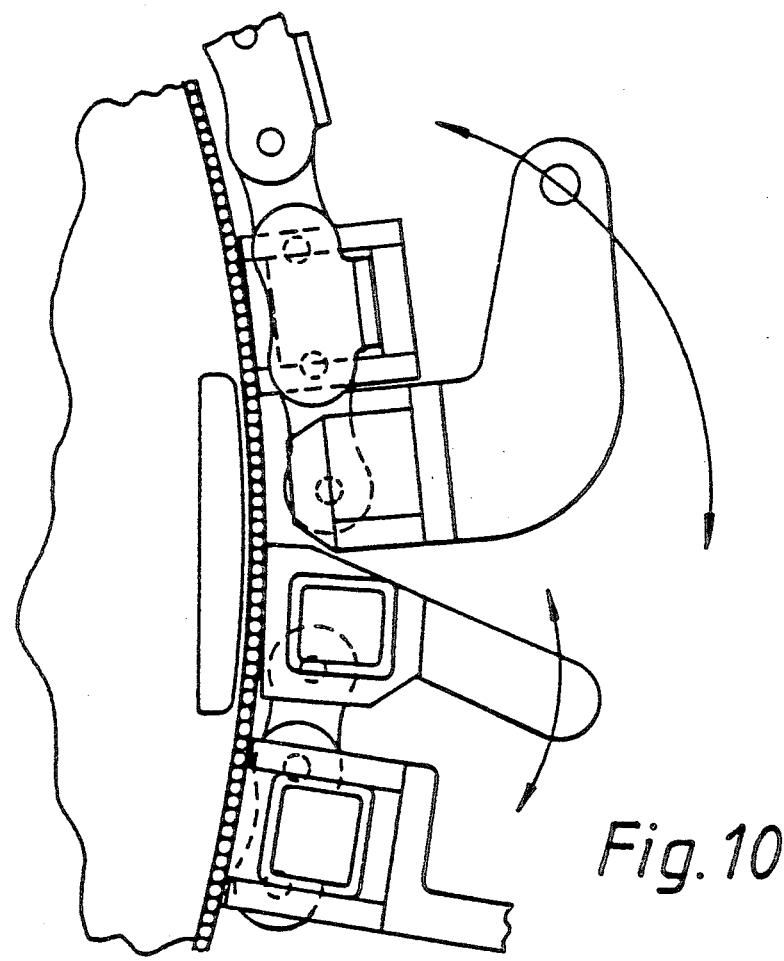
Figure 11:
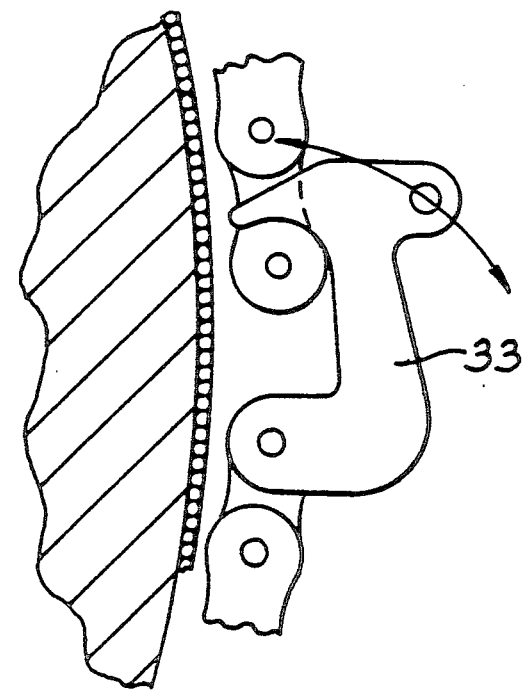
Figure 12:
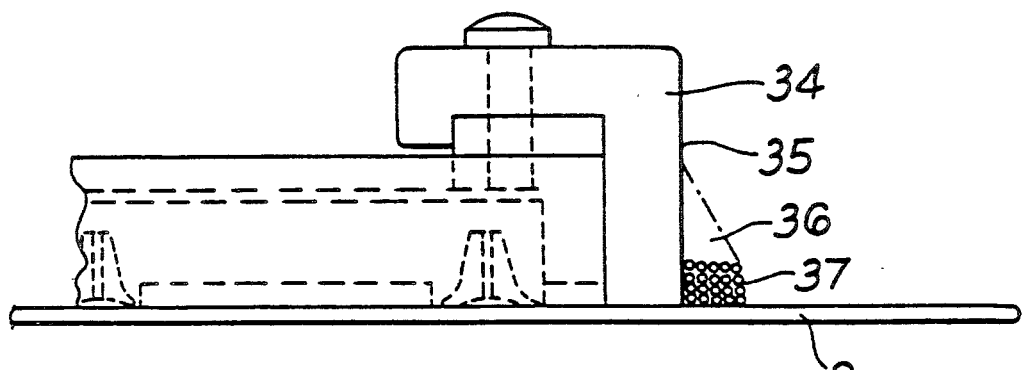
Figure 13:
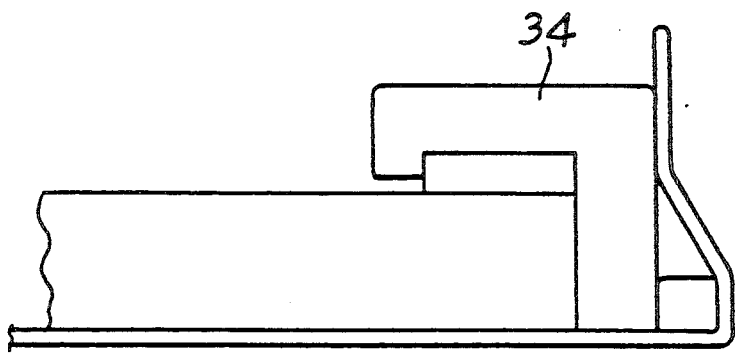
Figure 14:
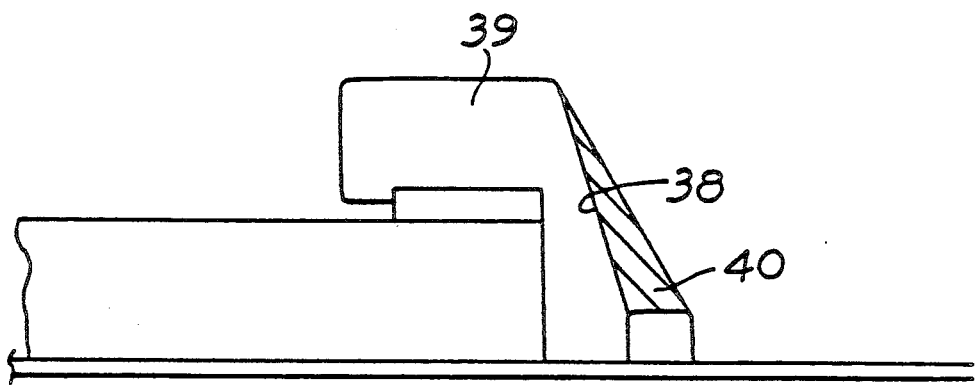
Figure 15:
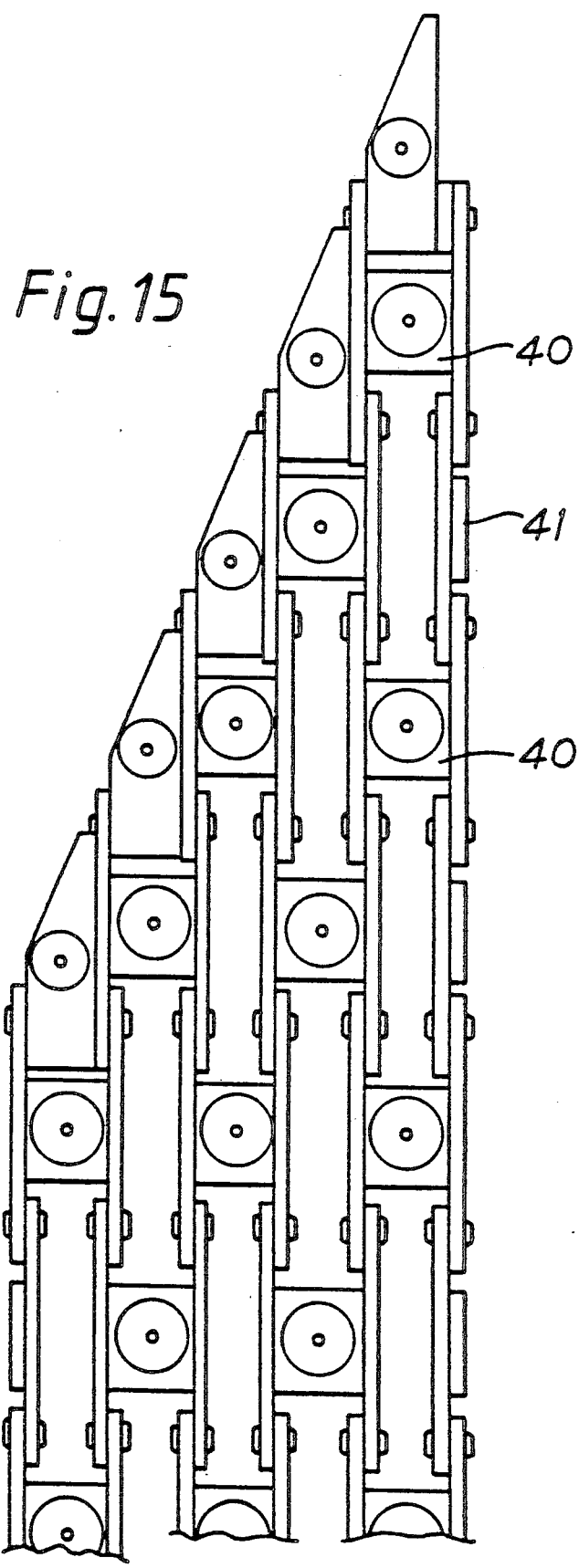
Figure 16A:
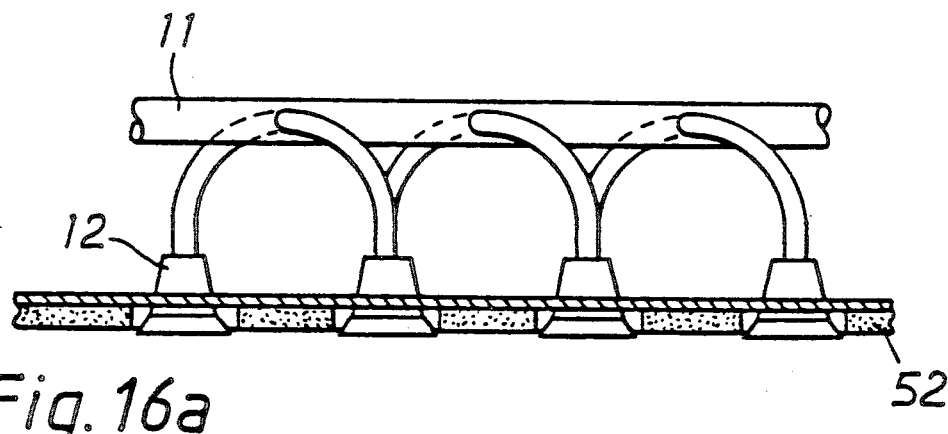
Figure 16B:
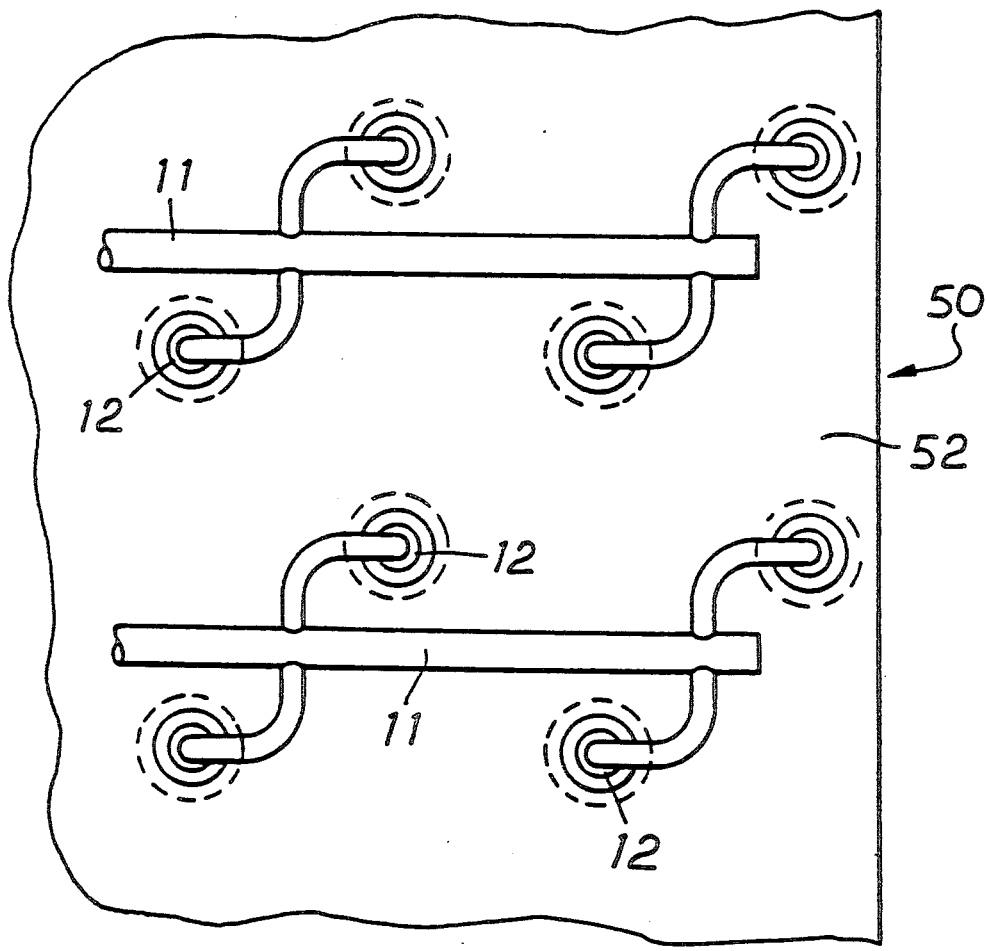

Embodiments of the present invention will now be described, by way of example only, with reference to the accompanying diagrammatic drawings, in which:

FIG. 1 shows partly in longitudinal section a part of a flexible carrier of a handling means for use in a method in accordance with the present invention, FIGS. 2-4 show part of the operation of the handling means to transfer sheet material to the flexible carrier at a first work station, FIGS. 5-8 show stages in the transfer of sheet material from the first to a second work station, FIGS. 9-11 show details of carrier holding means operable at the second work station, FIGS. 12-14 show details of the assembly of tire bead formations at the second working station, FIG. 15 is a plan view of part of a flexible carrier of another handling means for use in a method in accordance with the present invention, and FIGS. 16a and 16b respectively show side and plan views of a flexible carrier of handling means for use in a method in accordance with a further aspect of the present invention.

One embodiment of a method of manufacturing a component part for a pneumatic tire of the radial ply type is now described with reference to FIGS. 1-13 of the accompanying drawings.

A flexible carrier 15 for transportation of a ply of cord-reinforced flexible sheet material 9 between two work stations comprises a plurality of rigid hollow section slats 10 arranged in a parallel side-by-side relationship and interconnected by chains 13. The flexibility of the chains combined with the rigidity of the slats results in a flexible carrier which can be rolled upon itself about an axis perpendicular to the plane of FIG. 1 but which is substantially rigid to resist deformation about an axis extending across FIG. 1 in the plane thereof.

Each slat 10 houses a vacuum manifold which communicates with a plurality of vacuum suction cups 12 provided at a support surface of the carrier, being a lower surface of the carrier as shown in FIG. 1 in which the carrier is in an inverted condition.

The left-hand portion of FIG. 1 shows the carrier 15 in use to support a piece of flexible reinforced ply sheet material 9, the material being held securely to the carrier support surface by a vacuum acting through the cups 12.

The slatted carrier 15 is accurately located and supported by a carriage 16. One edge of the carriage is provided with ply clamp means 23 the function of which will be described below. The slats extend transversely relative to the length of the carrier.

As supported by the carriage 16, the slatted carrier 15 is movable in two mutually perpendicular directions X, Y (see FIGS. 5 and 6) between a first work station comprising mandrel 14 and a second work station comprising former 25.

In the direction X the carriage and carrier are movable in unison to and from the mandrel 14 by drive means not shown. In the direction Y the carrier is movable over the carriage to and from the former 25 also by drive means not shown. For this purpose the carriage is provided with guidance grooves 16a, 16b, 16c in which carrier support wheels (not shown) are located and guided.

The mandrel 14 is of a kind around which there has been formed, for example by helical winding, a layer of flexible elastomeric material having at least one helically extending reinforcing cord either wholly or partially embedded therein. The tubular layer of ply fabric is cut substantially parallel with the axis of rotation of the mandrel to provide a pair of cut edges 17, 18.

To transfer the ply fabric from the mandrel to the carrier 15 the carrier 15 and carriage 16 are moved in unison toward the mandrel 14 in the direction of arrow X. The positioning of the carrier relative to the mandrel in the direction Y is carefully controlled by position sensing and control means, not shown but of conventional type, prior to movement in the direction X thereby to ensure that when the carrier 15 comes toward the mandrel the carrier lies substantially centrally relative to the width of the ply fabric carried by the mandrel.

A final alignment operation ensures that the edges 21, 22 of the ply fabric are aligned precisely with the end edges 19, 20 of the carrier. This alignment operation utilises control arms 19a, 19b to move the slats sideways within the tolerance provided by the pin clearances in the carrier chains 13. (The control arms 19a and 20a, and the associated drive means 19b, 20b are positioned to lie within the central carriage groove 16b.) The leading edge 21 is first aligned precisely relative to the end edge 19 of the carrier and the carrier end edge 20 is then finely adjusted for accurate alignment with the ply fabric edge 22.

Having precisely aligned the respective edges 19, 20, 21, 22 of the fabric and carrier the clamp 23 is operated to grip the cut edge 18 of the ply fabric 9 and hold that edge on the carrier. Transfer of the ply fabric 9 from the mandrel to the carrier is then completed by rotating the mandrel 14 slowly, in a clockwise direction as viewed in FIGS. 2 and 3, concurrent with linear movement of the carriage as the latter returns from underneath the mandrel to the relative positioning shown in FIG. 2. If the ply fabric does not tend inherently to adhere to the mandrel 14 the mandrel may be provided with vacuum or like retention means to ensure proper support for the fabric as it is unwound onto the carrier. Vacuum is applied through the suction cups 12 to retain the ply fabric assembly positioned on the carrier.

Figure 5:
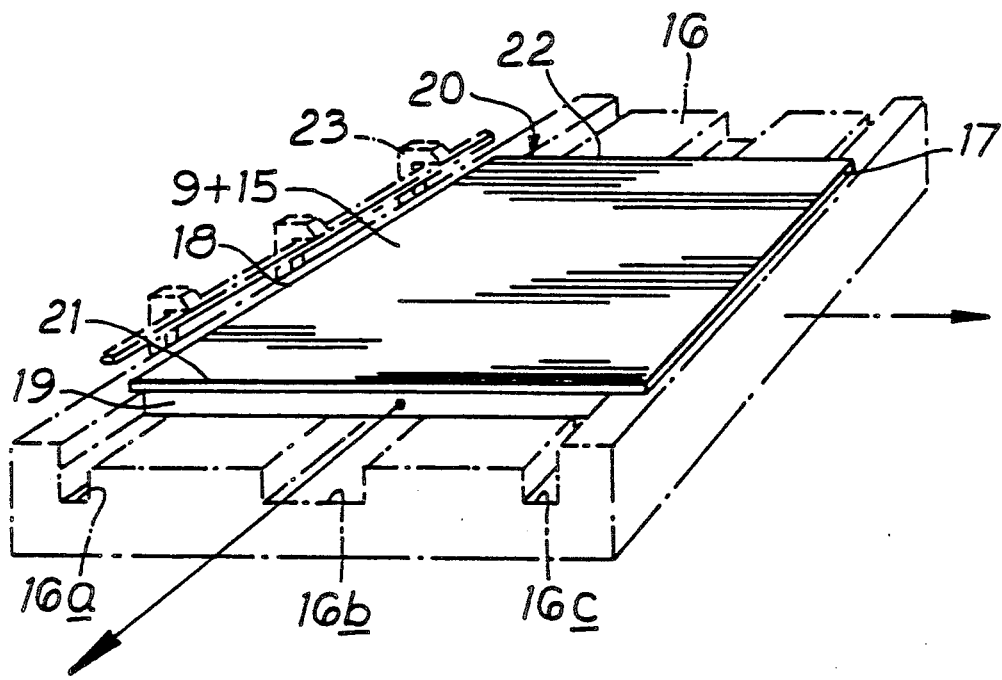

When the transfer is complete the ply is held firmly and positioned accurately on the carrier 15 in the manner shown in FIG. 5.

The carrier thus supports a sheet of ply fabric of a kind which as unwound from the mandrel comprises a reinforcement of a plurality of parallel cords.

From FIG. 5 it will be seen that in this embodiment of the invention the cut edges 17, 18 of the ply fabric overhang the ends of the slats. This arises because the circumferential length of the ply fabric 9 on the mandrel 14 is arranged to be greater than the slat length and the purpose of this will be described below.

Figure 6:
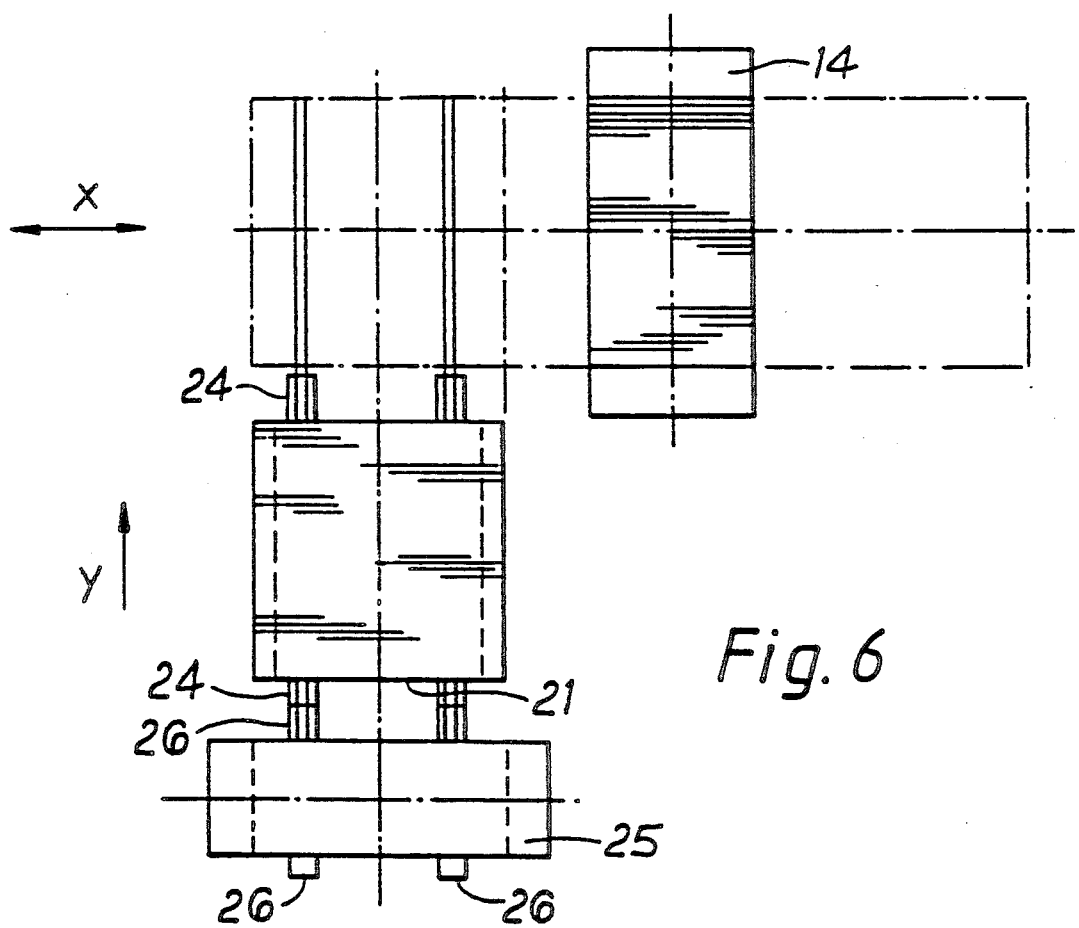

To continue the process of tire manufacture, the accurately positioned ply and carrier are transported along a carriage guide track 24 to a second work station where an already prepared building former 25 and carrier guide system 26, which aligns with the guide tracks 24, facilitates alignment and assembly of the ply onto the former 25 (see FIGS. 6 and 7). The former is of a cylindrical shape and the width of the ply fabric 9 when on the mandrel 14 is selected to correspond closely with the circumferential length of the former in this embodiment in which the material on the mandrel 14 is to be cut longitudinally. (If the material on the mandrel were to be cut transversely other than in the longitudinal direction, e.g. helically relative to the longitudinal axis of the mandrel, the length of that cut should correspond closely with the circumferential length of the former.)

The conveying direction Y to the former 25 results in the edge 21 of the ply fabric becoming the leading edge. The carrier moves into support by the guide system 26 to a prescribed position at which the now leading edge 21 is gripped and held by clamps 27 contained within the mechanism of guide system 26 (see FIG. 7).

An upper portion of guide system 26 extends through a semi-circular path thereby to position edge 21 such that it can be manipulated to form an invisible joint when the trailing edge 22 of the ply fabric is brought upwards and round, supported on the carrier, to complete encirclement of the former as shown in FIG. 8.

Joining of the ends 19, 20 of the carrier will now be described with reference to FIGS. 9 and 10. As the clamps 27 draw the leading edge 21 of the carrier to the position shown in FIG. 8 a holding finger 28 extends axially between the former 25 and the guide system. The finger 28 is then moved radially outwards to contact and support the exposed face of the ply end 21 which is held and supported by the leading end 19 of carrier 15. The finger 28 may incorporate a vacuum facility for retention of ply fabric and/or a pressure facility to cause ply fabric to lift from the finger. In FIG. 9 the end 19 is shown as part of end slat 29 and end 20 as part of slat 30. The vacuum holding action of these slats can be separately controlled so that when finger 28 has hold of ply edge 21 the holding action of slat 29 can be released and slat 29 rotated in a direction so as to expose the ply edge 21.

In FIGS. 8 and 9 the guide track closing mechanism 31 is shown lifting end slat 30 in an involute path so as to cause end 20 to contact guiding face 32 of slat 29 which is exposed and positioned when slat 29 is rotated. The end 20 can then be guided, in one continuous motion, by face 32 to move the ply edge 22 into, for example, an overlapping contact with the exposed edge 21 and apply a joining force which is resisted by the finger 28. The joint is then completed with mechanism lying as shown in FIG. 10.

Preferably end slat 30 is also rotated to expose the completed joint so that a consolidating roller (not shown) can traverse the joint to ensure that it is firmly held together over its entire length.

The joining process is completed by the slat 30 being returned to contact and hold the joint while latches 33 (see FIG. 11) are operated to cause the carrier to become a continuous hoop. The finger 28 is then removed so that former 25 can expand radially and cause components which have been pre-applied to the former to contact the ply.

The carrier is then in a condition to provide the means of positioning the tire beads. If conventionally produced tire beads and apexes are employed these may be fitted and held to the ends of the now continuous support tube formed by the carrier before the former is expanded against the inside of the support tube. By virtue of the aforedescribed feature of the cut edges 17, 18 of the ply fabric overhanging the ends of the slats the overhanging ends can be turned radially outwards around the beads, thereby to assist in locating the beads and resisting their subsequent axial separation.

FIG. 12 illustrates another method of providing and positioning the beads. Each bead 36 and apex 37 can be wound against a respective edge of the continuous support tube after the former has expanded. In this process the slats are fitted with special brackets 34 to create a supporting face 35 against which the bead 36 and apex 37, or bead and apex assembly, can be wound.

FIG. 13 illustrates the benefit gained during the turning up operation by leaving the carrier with brackets 34 in situ so that the length of reinforcing cords of the ply which is locked around the beads is precisely defined and the brackets 34 provide an anvil against which the ply turn-up can be consolidated.

When the consolidation has been completed the use of the carrier is virtually complete if the type of former in use is one which is capable of providing the means of inflating the carcass into its final toroidal form. The carrier can then be removed to perform another cycle of operation. If however the former used does not have the means to inflate the carcass the carrier can perform yet another function by holding the carcass in its now tubular form while the former is exchanged for one which can perform the inflation operation before the carrier is removed from the outer surface of the carcass.

FIG. 14 illustrates a yet further method for providing and positioning the beads. The bracket 39 has an inclined surface 38 whereby a circumferentially extending series of the brackets define a frustoconical surface against which an inwardly inclined bead apex region 40 may be formed. The flexibility of the apex in the finished assembly allows removal of the carrier.

FIG. 15 illustrates another form of the carrier described as a chain mat and comprising a staggered array of blocks 40 interconnected by chain links 41. This form of carrier is most useful for handling reinforced components which have a parallelogram shape such as used in cross-ply tires or suspension units or breaker plies of radial tires. The carrier can be used substantially in the same manner as described for the aforedescribed slatted version. It can also be contorted in an angular plane so that the vacuum pick-off and application processes can be achieved in a circular path different from the angle of any reinforcing cords contained in the supported sheet material.

FIG. 16 illustrates yet another form of the carrier 50 which has instead of or in addition to its proprietory vacuum cups 51 a vacuum support system which covers an area extending to the shape of the sheet material component to be carried by the carrier. This form of carrier can use, for example, reticulated flexible foamed plastics material 52 in contrast to the aforedescribed slats or blocks and can be used to provide support for sheet material over the whole of its surface. It is therefore well suited for use with elastomeric components which do not contain reinforcement.

I claim:

1. A method for the manufacture of a tubular article comprising receiving flexible sheet material onto a flexible carrier of a non-tubular form at a first work station, feeding said sheet material from the first to a second work station whilst said material is supported on and retained by the flexible carrier and causing said sheet material and flexible carrier to lie at the second work station in a peripherally continuous tubular form substantially coaxially relative to a former with the sheet material disposed between the flexible carrier and former with the flexible carrier completely encircling the sheet material, and then moving said former and carrier relatively one toward the other whereby said sheet material may be subject to pressure between the former and carrier.

2. The method claimed in claim 1, wherein the direction relative to the carrier in which the sheet material is received by the carrier at the first work station is substantially perpendicular to the direction relative to the carrier in which the sheet material is transferred to the second work station.

3. The method claimed in claim 2, wherein the sheet material is of substantially tubular form at each of said first and second work stations, a strip of the material which lies in a direction substantially parallel with a longitudinal direction between axial ends of said tubular form at the first work station thereby being disposed to lie substantially circumferentially at the second work station.

4. The method claimed in claim 3, wherein at the first work station the sheet material is provided in a tubular form having a pair of substantially longitudinally extending edge regions whereby said material may be unfolded and received by the flexible carrier.

5. The method claimed in claim 1, wherein at the first work station the sheet material is provided in a tubular form having a pair of transverse edges extending between axial ends of the tubular form and is transferred from the flexible carrier to the second work station in a direction substantially parallel with the direction of the length of said transverse edges when the sheet material is supported by the carrier.

6. The method claimed in claim 1, wherein edge regions of the flexible sheet material overhang edge regions of the flexible carrier when the sheet material is supported and retained by the flexible carrier.

7. The method claimed in claim 6, wherein at the second work station a pair of annular reinforcing beads are positioned around the flexible sheet material substantially adjacent respective annular ends of the flexible carrier when in said tubular form.

8. The method claimed in claim 7, wherein at the second work station said edge regions are turned radially outwards around the respective annular reinforcing beads.

9. The method claimed in claim 1, wherein the former is an expansible former and the flexible carrier is caused to adopt a tubular form in which it extends around the expansible former at the second work station.

10. The method claimed in claim 9 for the manufacture of a tubular article comprising two tubular component layers wherein a first component layer is applied to the expansible former and brought into contact with a second component layer supported in tubular form on the flexible carrier when at the second work station by expansion of the former.

11. The method claimed in claim 10, wherein said first component layer is applied to the expansible former by means of said flexible carrier.

12. The method claimed in claim 10, wherein said expansion of the former transfers the first component layer to the second component layer for support thereby.

13. The method claimed in claim 9, wherein at the second work station the flexible carrier initially causes the sheet material to adopt a generally tubular form, longitudinal edge regions of the carrier extending in a direction between axial ends of said tubular former are retracted outwards from the sheet material and a consolidating roller is applied over the joint region of confronting end portions of the sheet material.

14. The method claimed in claims 9, wherein when at the second work station edge regions of the support carrier extending in a direction between axial ends of said tubular former are interconnected whereby the carrier is able to support the sheet material against pressure exerted thereon when the former is expanded.

15. The method claimed in claim 1, wherein the flexible carrier is arranged to adopt a substantially flat form for receiving flexible sheet material when at the first work station.

16. The method claimed in claim 1, wherein the sheet material is in a tubular form at the first work station and comprises a reinforcing element which extends helically at said first work station.

17. The method claimed in claim 1, wherein said tubular article is deformed to a substantially toroidal shape.

* * * * *